UNITED STATES PATENT OFFICE.

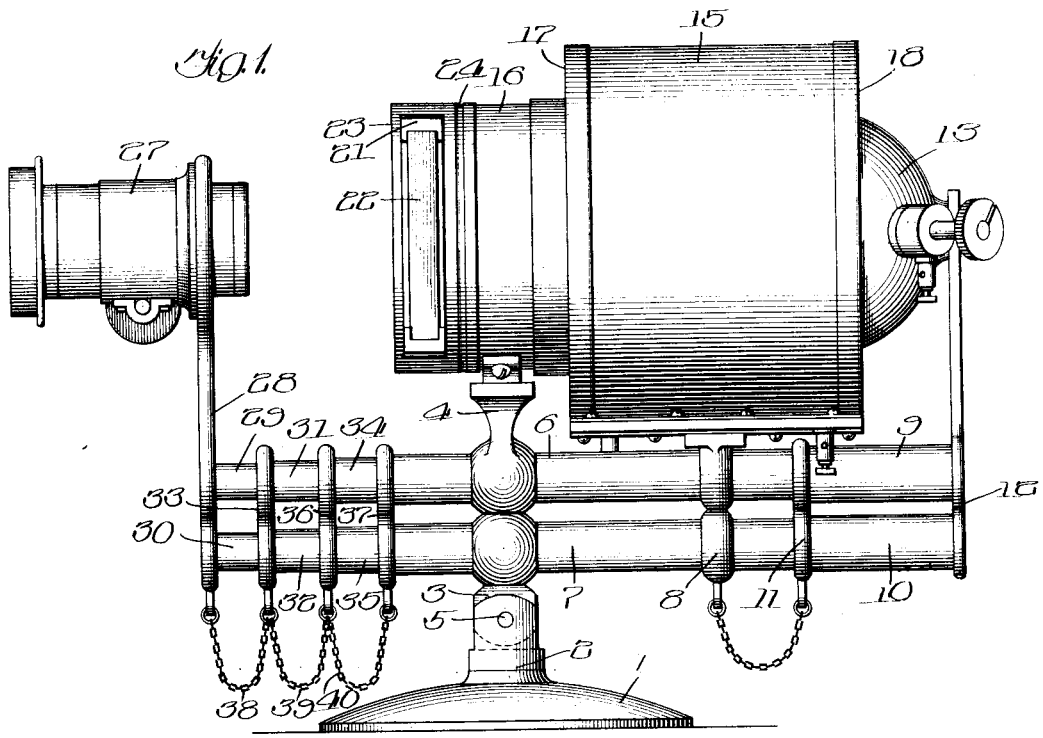
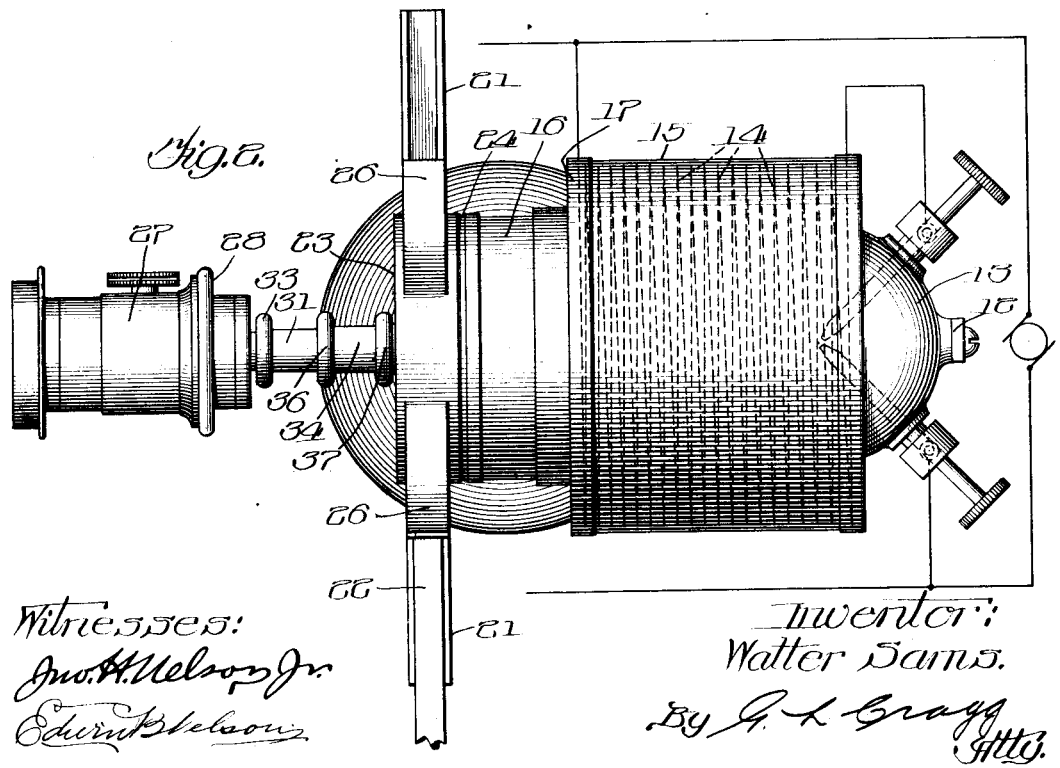

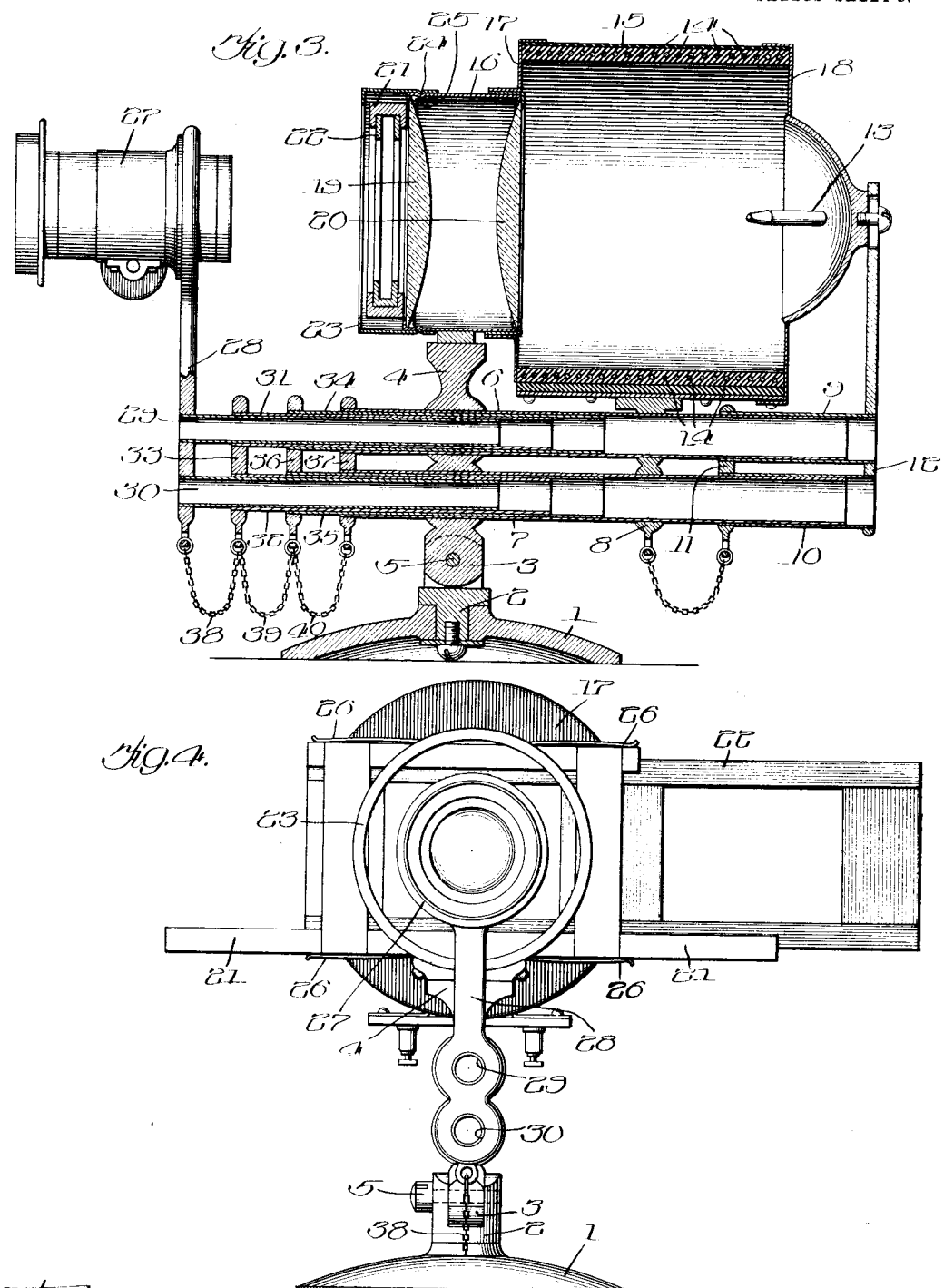

WALTER SAMS, OF CHICAGO, ILLINOIS.

IMAGE-PROJECTOR.

1,117,252.     Specification of Letters Patent.     Patented Nov. 17, 1914.

Application filed July 8, 1912, Serial No. 708,132. Renewed April 10, 1914. Serial No. 831,046.

*To all whom it may concern:*

Be it known that I, WALTER SAMS, a citizen of the United States, residing at Chicago, in the county of Cook and State of Illinois, have invented a certain new and useful Improvement in Image-Projectors, of which the following is a full, clear, concise, and exact description, reference being had to the accompanying drawings, forming a part of this specification.

My invention relates to image projecting apparatus and has been specifically embodied in a stereopticon, though the invention is not to be limited to such an embodiment.

My invention, in its specific aspect, relates to those image projecting devices that employ electric lamps and has for an object such a location and formation of the resistance employed to adapt the lamps to line voltages as to enable such resistance to act as light shields to prevent the undue escape of light. It is to be understood, however, that my invention is not to be limited to image projecting devices that employ electric lamps, in all embodiments of the invention.

My invention has for another of its objects the provision of improved means for leveling the image with respect to the field upon which it is to be projected. The invention has for another of its objects an improvement in the construction of the telescoping members whereby the lenses and lamps may be depressed so that the alinement of these elements with respect to the images that are to be projected may be duly maintained.

The invention has for a further object the provision of improved means for limiting the extent to which the telescoping elements may be drawn apart.

I will explain my invention more fully by reference to the accompanying drawings showing the preferred embodiment thereof and in which—

Figure 1 is a view in side elevation of a stereopticon constructed in accordance with the invention; Fig. 2 is a plan view of the structure shown in Fig. 1, circuit connections being added when the device is to be used in connection with an electric circuit for furnishing light; Fig. 3 is a longitudinal elevation, mainly in section, of the structure; and Fig. 4 is a view in front elevation of the structure.

Like parts are indicated by similar characters of reference throughout the different figures.

The structure includes a mounting base 1 that supports a shaft 2 which is rotatable in the mounting base about a vertical axis, this shaft 2 being bifurcated at its upper end to afford a vertically disposed recess in which it receives the tongue 3 of a shaft 4, the tongue being rotatable about a horizontal axis afforded by the pin 5 passing through the bifurcated portion of the shaft 2 and the tongue 3, whereby the machine may be adjusted with respect to the field upon which it is to cast the image. The shaft 4 has two holes passing therethrough longitudinally of the machine and through which pipe sections 6 and 7 pass and in which said pipe sections are preferably movable longitudinally of the machine while at the same time they are fixed with respect to each other, a yoke 8 being employed for this latter purpose. Pipe sections or telescoping members 9 and 10 are in telescopic relation with the members 6 and 7 and are themselves rigidly held with respect to each other by means of yokes 11 and 12. The yoke 12 is vertically extended upwardly and supports, at its upper end, a source of light 13 which, in the embodiment of the invention herein shown, is an electric lamp employing separated carbon pencils between which a lighting arc may be established, though I do not limit myself to the employment of an electric lamp in all embodiments of my invention nor to an electric lamp in the form of arc lamp in the particular embodiment of the invention illustrated. It is customary to connect the lamps, when they are in the form of electric lamps, in bridge of supply conductors and in such event the lamp bridge is to include a resistance to reduce the voltage to that required by the lamp. Such a resistance is shown at 14 in Figs. 2 and 3 and is in the form of a suitable resistance wire that is properly supported by a hollow cylinder or tube of insulating material 15. Instead of locating this resistance in a position in which it performs merely its electrical function, I mount the same so that the axis of its cylinder includes the focus of the lamp whereby rays of light emanating from the lamp are shielded or shut in so that the surroundings of the apparatus are in suitable darkness, whereby interference with the proper projection of the images is prevented, the bore of the cylinder or tube being of sufficient size to permit of the passage of sufficient light therethrough. To secure the best results the composite resistance and light shield 14, 15 is located immediately in front of the lamp 13 and immediately behind the lens mount 16, the light shield filling the space between the lamp and the lens mount, though I do not limit myself to this location of the light shield. Further to guard against the escape of light rays, the cylinder 15 is provided with an annular shield 17 that closes the annular gap between the lens mount 16 and the element 15, a second annular shield 18 being located between the rear of the element 15 and the lamp structure so as to close the annular gap intervening between the elements 13 and 15. The element 15 may be supported in any suitable way, it being shown as being mounted upon the upper end of the yoke 8 in the embodiment of the invention illustrated. The lens mount 16 supports the usual or suitable condensing lenses 19, 20.

A slide guide 21 is mounted in front of the lenses, this guide receiving an image holding slide 22 that is employed for holding the images that are to be projected upon a field. In the embodiment of the invention illustrated the image holding slide 22 is adapted to receive glass plates upon which the images to be projected are provided. The condensing lens mount 16 is provided with an annular cap 23, and as the lens mount and lens cap are both cylindrical and of closely approximated diameters, the cap may be turned upon the mount, longitudinal separation of the cap and mount being prevented by insetting engaging annular beads 24, 25 provided upon the cap and mount as illustrated in Fig. 3. Four segments of the peripheral portion of the annular cap 23 are struck outwardly to form spring fingers as indicated at 26, at once forming a space through the cap 23 in which the image holding slide 22 may be moved transversely through the cap and spring fingers for engaging the slide guide 21 and yieldingly mounting the same in normally fixed position with respect to said cap. The level of the image may be adjusted without changing the relationship between the cap 23 and the slide guide 21 merely by turning the cap 23 upon the lens mount 16.

The structure illustrated includes an objective lens whose mount 27 is supported at the upper end of a yoke 28, this yoke 28 being in rigid relation with two telescoping members or rods 29, 30 that are in telescoping relation with the rods 6 and 7. The objective lens may be adjusted forwardly and rearwardly by moving the hollow rods 29, 30 out and in. Additional rods 31 and 32, united by a yoke 33, may be interposed between the rods 29 and 30 and the rods 6 and 7 and, further, rods 34 and 35, united by a yoke 36, may be interposed between the rods 31 and 32 and the rods 6 and 7. The forward ends of the rods 6 and 7 may be united by a yoke 37 further to hold these two rods in rigid relation. I do not limit myself to the number of telescoping rods that are interposed between the objective lens and the main telescoping rods 6 and 7. The extent to which one pair of rods in telescoping engagement with another may be drawn apart is limited by a chain or other flexible or collapsible connection intervening between the yokes of such rods. Thus, in Figs. 1 and 3, I have illustrated a collapsible connection 38 between the yokes 28 and 33, a collapsible connection 39 between the yokes 33 and 36, and a collapsible connection 40 between the yokes 36 and 37, these connections being sufficiently short to prevent the complete disengagement of the telescoping members while at the same time allowing them to be sufficiently extended to suit the range of adjustment for which the telescoping members are provided. By the mechansim illustrated the lamp 13 may be adjusted without fear on the part of the operator that it will become dismounted. I consider the flexible connections which have been described broadly to be new with me irrespective of the construction and arrangement of the telescoping members.

It will be observed that the telescoping members are arranged in two sets, the set 6, 9, 29, 31 and 34 overlying the set 7, 10, 30, 32 and 35. By this arrangement the objective lens may be placed in its foremost position and the lamp 13 may be placed in its rearmost position without danger of disturbing the alinement of the lamp, the condensing lenses and the objective lens, since the flexure in a vertical plane of the supports for the objective lens in the lamp structure is guarded against because of the superimposition of one set of telescoping elements above the other. I am aware that it was hitherto the practice to locate both sets of telescoping elements side by side in a horizontal plant, but it will be obvious that such an arrangement of the prior art will not accomplish the result which is accomplished by the arrangement of the sets of telescoping elements herein disclosed.

While I have herein shown and particularly described the preferred embodiment of my invention I do not wish to be limited to the precise details of construction shown as changes may readily be made without departing from the spirit of the invention, but

Having thus described my invention I claim as new and desire to secure by Letters Patent the following:—

1. An image projector including an electric lamp; a lens element in the path of light emanating from the lamp; and a resistance element for inclusion in circuit with the lamp and constituting a light shield along which light rays from the lamp pass.

2. An image projector including an electric lamp; a lens element in the path of light emanating from the lamp; and a resistance element of tubular formation for inclusion in circuit with the lamp and constituting a light shield through whose bore light rays from the lamp pass.

3. An image projector including an electric lamp; a condesing lens element in the path of light emanating from the lamp; and a resistance element of tubular formation for inclusion in circuit with the lamp and constituting a light shield through whose bore light rays from the lamp pass, the light shield being interposed between the lamp and the condensing lens element.

4. An image projector including an electric lamp; a condensing lens element in the path of light emanating from the lamp; and a resistance element for inclusion in circuit with the lamp and constituting a light shield along which light rays from the lamp pass, the light shield being interposed between the lamp and the condensing lens element.

In witness whereof, I hereunto subscribe my name this fifth day of July A. D. 1912.

WALTER SAMS.

Witnesses:
E. L. WHITE,
G. L. CRAGG.